(12) United States Patent
Tang

(10) Patent No.: US 11,553,495 B2
(45) Date of Patent: Jan. 10, 2023

(54) METHOD AND DEVICE FOR SENDING UPLINK CHANNEL, AND METHOD AND DEVICE FOR RECEIVING UPLINK CHANNEL

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/038,729

(22) Filed: Sep. 30, 2020

(65) Prior Publication Data

US 2021/0014868 A1 Jan. 14, 2021

Related U.S. Application Data

(63) Continuation of application No. PCT/CN2018/081999, filed on Apr. 4, 2018.

(51) Int. Cl.
| | | |
|---|---|---|
| *H04W 72/04* | (2009.01) | |
| *H04W 76/27* | (2018.01) | |
| *H04L 5/00* | (2006.01) | |

(52) U.S. Cl.
CPC ........ *H04W 72/0493* (2013.01); *H04L 5/0094* (2013.01); *H04W 72/0413* (2013.01); *H04W 72/0453* (2013.01); *H04W 76/27* (2018.02)

(58) Field of Classification Search
None
See application file for complete search history.

(56) References Cited

U.S. PATENT DOCUMENTS

2016/0360532 A1* 12/2016 Xiao ................. H04L 5/0055
2019/0274162 A1* 9/2019 Zhang ................ H04W 74/08
(Continued)

FOREIGN PATENT DOCUMENTS

| CN | 103535086 A | 1/2014 |
|---|---|---|
| CN | 105594286 A | 5/2016 |

(Continued)

OTHER PUBLICATIONS

R1-1802865 Qualcomm "Potential solutions and techniques for NR unlicensed" 3GPP WG1 #92 Athens Feb. 26-Mar. 2, 2018. (Year: 2018).*

(Continued)

*Primary Examiner* — Basil Ma
(74) *Attorney, Agent, or Firm* — Bayes PLLC

(57) ABSTRACT

Provided are a method and device for sending an uplink channel and a method and device for receiving an uplink channel. The method includes that a terminal device determines a first transmission resource on a first time unit on a first carrier. The first transmission resource is configured to transmit a first uplink channel. The first transmission resource is allocated with N frequency domain units on a frequency domain, where N is a positive integer, and N≥2. The method also includes that the terminal device transmits the first uplink channel by the first transmission resource. By means of the uplink channel transmission method in embodiments of the present disclosure, a terminal device can utilize a transmission power more efficiently.

16 Claims, 4 Drawing Sheets

(56) References Cited

U.S. PATENT DOCUMENTS

| | | | | |
|---|---|---|---|---|
| 2019/0297620 A1* | 9/2019 | Tian | ...................... | H04L 1/1812 |
| 2020/0068443 A1* | 2/2020 | Liu | ...................... | H04W 8/245 |

FOREIGN PATENT DOCUMENTS

| | | |
|---|---|---|
| CN | 107241802 A | 10/2017 |
| CN | 107409417 A | 11/2017 |
| CN | 107846373 A | 3/2018 |
| WO | 2017/171847 A1 | 10/2017 |
| WO | 2017219284 A1 | 12/2017 |
| WO | 2018047886 A1 | 3/2018 |
| WO | 2019191963 A1 | 10/2019 |

OTHER PUBLICATIONS

First Office action issued in corresponding Canadian Application No. 3,095,910, dated Oct. 13, 2021, mailed 3 pages.

Notice of Reasons for Refusal issued in corresponding Japanese Application No. 2020-553623, dated Dec. 3, 2021, 6 pages.

First Office action issued in corresponding India Application No. 202027047556, dated Dec. 7, 2021, 8 pages.

Communication pursuant to Article 94(3) EPC issued in corresponding European Application No. 18913974.4, dated Dec. 23, 2021, 9 pages.

"On interlace design for NR U uplink", Agenda Item: 7.6.5, Source: Ericsson, 3GPP TSG RAN WG1 Meeting #92 R1-1802776, Athens, Greece, Feb. 26-Mar. 2, 2018, 4 pages.

"Waveform Options Under PSD limitation", Agenda item: 7.6.5, Source: Qualcomm Incorporated, 3GPP TSG RAN WG1 Meeting #92 R1-1802869, Athens, Greece, Feb. 26-Mar. 2, 2018, 12 pages.

PCT Written Opinion of the International Searching Authority issued in corresponding International Application No. PCT/CN2018/081999, dated Nov. 29, 2018, 9 pages.

"Potential solutions and techniques for NR unlicensed", Agenda item: 7.6.4, Source: Qualcomm Incorporated, 3GPP TSG RAN WG1 Meeting #92, R1 1802865, Athens, Greece, Feb. 26 Mar. 2, 2018, 11 pages.

Supplementary European Search Report issued in corresponding European Application No. EP 18 91 3974, dated Mar. 16, 2021, 11 pages.

"Open issues for wider bandwidth operations", Agenda item: 5.1.7, Source: Intel Corporation, 3GPP TSG RAN WG1 NR Ad-Hoc#2, R1-1710583, Qingdao, P.R. China Jun. 27-30, 2017, 7 pages.

"Discussion on PRACH for eLAA UL", Agenda item: 7.3.1.4, Source: INTT Docomo, Inc., 3GPP TSG RAN WG1 Meeting #84, R1-160950, St Julian's, Malta, Feb. 15-19, 2016, 5 pages.

First Office Action issued in corresponding Chinese Application No. 202011329592.3, dated Jun. 8, 2022, 19 pages.

Notice of Reasons for Refusal issued in corresponding Japanese Application No. 2020-553623, dated May 13, 2022, 6 pages.

Notice of Submission of Opinion issued in corresponding Korean Application No. 10-2020-7028639, dated May 19, 2022, 11 pages.

Second Office Action issued in corresponding European Application No. 18913974.4, dated Jul. 22, 2022.

Notice of Allowance issued in corresponding Chinese Application No. 202011329592.3, dated Aug. 31, 2022.

Second Office Action issued in corresponding Canadian Application No. 3,095,910, dated Sep. 23, 2022.

Decision of Rejection issued in corresponding Japanese Application No. 2020-553623, dated Nov. 1, 2022.

First Office Action issued in corresponding Taiwanese Application No. 108111783, dated Sep. 30, 2022.

* cited by examiner

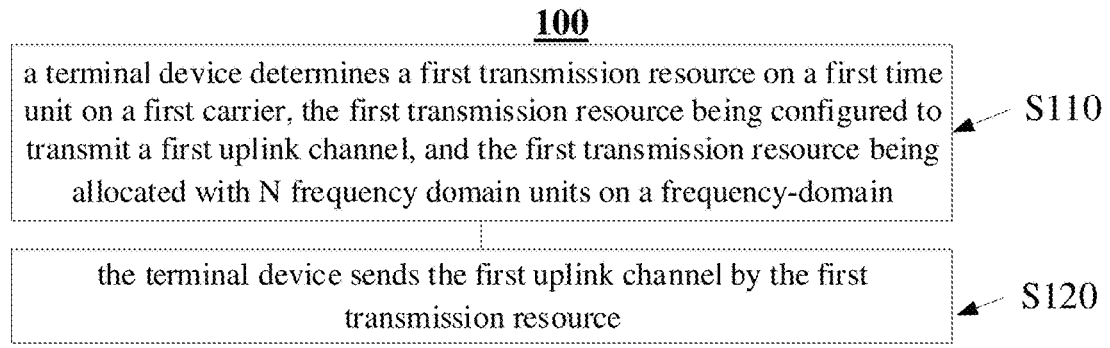
FIG. 1
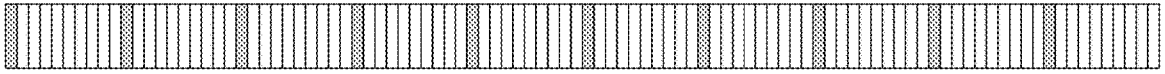
FIG. 2
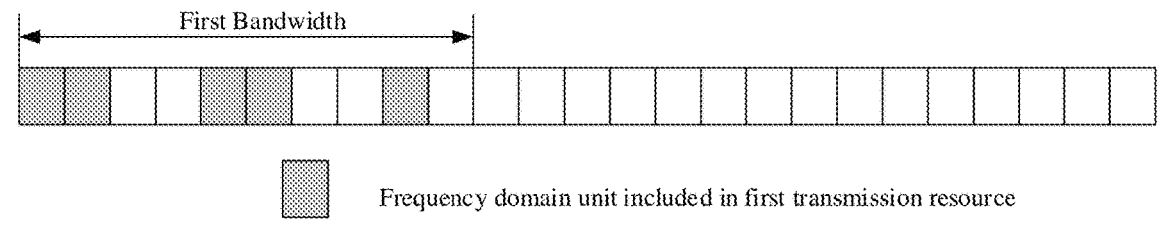
FIG. 3
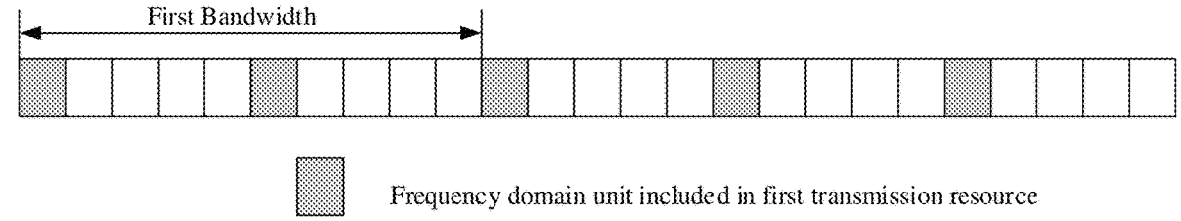
FIG. 4

200

A network device determines a first transmission resource on a first time unit on a first carrier, the first transmission resource being configured to transmit a first uplink channel, and the first transmission resource being allocated with N frequency domain units on a frequency domain  ← S210

The network device receives the first uplink channel by the first transmission resource  ← S220

FIG. 8

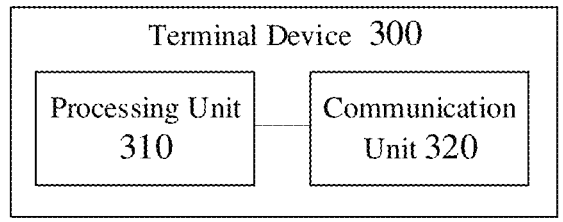

FIG. 9

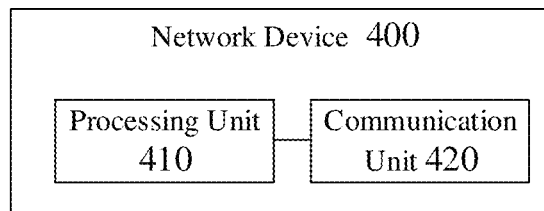

FIG. 10

METHOD AND DEVICE FOR SENDING UPLINK CHANNEL, AND METHOD AND DEVICE FOR RECEIVING UPLINK CHANNEL

CROSS-REFERENCE TO RELATED APPLICATIONS

The present disclosure is a continuation of International Application No. PCT/CN2018/081999, filed on Apr. 4, 2018, which is incorporated by reference in its entirety.

BACKGROUND

Embodiments of the present disclosure relate to the field of communications, and more specifically, to a method and device for sending an uplink channel and a method and device for receiving an uplink channel.

When a New Radio (NR) system is applied to a licensed carrier, since signal transmission on the licensed carrier is not limited by a maximum transmission power spectral density, a terminal device may use the maximum transmission power of the terminal device to perform transmission of an uplink signal on a Resource Block (RB) to ensure uplink coverage.

SUMMARY

Provided are a method and a device for sending an uplink channel and a method and a device for receiving an uplink channel.

In a first aspect, a method for sending an uplink channel is provided, including a terminal device determines a first transmission resource on a first time unit on a first carrier, the first transmission resource being configured to transmit a first uplink channel, the first transmission resource being allocated with N frequency domain units on a frequency domain, N being a positive integer, and N≥2; and the terminal device transmits the first uplink channel by the first transmission resource.

In the embodiment of the present disclosure, by allocating at least two frequency domain units for transmitting the first uplink channel, a transmission power of the uplink channel may be increased in a case where a maximum transmission power spectral density is limited.

In some possible implementation manners, a frequency domain interval between a first frequency domain unit and a last frequency domain unit in the N frequency domain units is less than or equal to a first bandwidth.

In some possible implementation manners, a bandwidth allocated to the N frequency domain units is less than or equal to the first bandwidth.

In some possible implementations, the first bandwidth is X, wherein X satisfies the condition that $10*\lg(X)+D=P$, where D represents a maximum transmission power spectral density on the first carrier, in dBm/MHz, P represents a maximum transmission power on the first carrier, in MHz, X in MHz, and lg represents a base-10 logarithm.

In the embodiment of the present disclosure, by limiting transmission of the first uplink channel in the first bandwidth, the terminal device may obtain more channel transmission opportunities without losing transmission power efficiency.

In some possible implementations, the first bandwidth is smaller than a second bandwidth, wherein the second bandwidth is a bandwidth configured by a network device for the terminal device for uplink transmission.

In some possible implementation manners, at least two adjacent frequency domain units in the N frequency domain units are discontinuous on the frequency domain.

In some possible implementation manners, N>2, and a frequency domain interval between any two adjacent frequency domain units in the N frequency domain units are equal.

In some possible implementation manners, the first uplink channel includes at least one of a physical random access channel (PRACH) and a physical uplink control channel (PUCCH).

In some possible implementation manners, the first transmission resource is a transmission resource corresponding to a first subcarrier spacing, and the method further includes the terminal device determines a second transmission resource on a second time unit on the first carrier, the second transmission resource being a transmission resource corresponding to a second subcarrier spacing, the second transmission resource being configured to transmit a second uplink channel, and the second transmission resource being allocated with N frequency domain units on the frequency domain, wherein, the second subcarrier spacing is greater than the first subcarrier spacing; and the terminal device sends the second uplink channel by the second transmission resource.

In some possible implementation manners, the first transmission resource is a transmission resource corresponding to a first subcarrier spacing, and the method further includes the terminal device determines a second transmission resource on a second time unit on the first carrier, the second transmission resource being a transmission resource corresponding to a second subcarrier spacing, the second transmission resource being configured to transmit a second uplink channel, the second transmission resource being allocated with M frequency domain units on the frequency domain, M being a positive integer, and M>N, wherein, the second subcarrier spacing is greater than the first subcarrier spacing; and the terminal device sends the second uplink channel by the second transmission resource.

In some possible implementation manners, the second uplink channel includes at least one of the physical random access channel (PRACH) and the physical uplink control channel (PUCCH).

In some possible implementation manners, the terminal device determining the first transmission resource on the first time unit on the first carrier includes the terminal device receives first indication information sent by the network device, the first indication information being used to determine the first transmission resource; and the terminal device determines the first transmission resource according to the first indication information.

In a second aspect, a method for receiving an uplink channel is provided, including a network device determines a first transmission resource on a first time unit on a first carrier, the first transmission resource being configured to receive a first uplink channel, the first transmission resource being allocated with N frequency domain units on a frequency domain, N being a positive integer, and N≥2; and the network device receives the first uplink channel by the first transmission resource.

In some possible implementation manners, a frequency domain interval between a first frequency domain unit and a last frequency domain unit in the N frequency domain units is less than or equal to a first bandwidth.

In some possible implementation manners, a bandwidth allocated to the N frequency domain units is less than or equal to the first bandwidth.

In some possible implementations, the first bandwidth is X, wherein X satisfies the condition that $10*\lg(X)+D=P$, where D represents a maximum transmission power spectral density on the first carrier, in dBm/MHz, P represents a maximum transmission power on the first carrier, in MHz, X in MHz, and lg represents a base-10 logarithm.

In some possible implementations, the first bandwidth is smaller than a second bandwidth, wherein the second bandwidth is a bandwidth configured by the network device for a terminal device for uplink transmission.

In some possible implementation manners, at least two adjacent frequency domain units in the N frequency domain units are discontinuous on the frequency domain.

In some possible implementation manners, N>2, and a frequency domain interval between any two adjacent frequency domain units in the N frequency domain units are equal.

In some possible implementation manners, the first uplink channel includes at least one of a physical random access channel (PRACH) and a physical uplink control channel (PUCCH).

In some possible implementation manners, the first transmission resource is a transmission resource corresponding to a first subcarrier spacing, and the method further includes the network device determines a second transmission resource on a second time unit on the first carrier, the second transmission resource being a transmission resource corresponding to a second subcarrier spacing, the second transmission resource being configured to receive a second uplink channel, the second transmission resource being allocated with N frequency domain units on the frequency domain, wherein, the second subcarrier spacing is greater than the first subcarrier spacing; and the network device receives the second uplink channel by the second transmission resource.

It should be understood that in the embodiments of the present disclosure, the network device may configure the first subcarrier spacing and the second subcarrier spacing for different times of one terminal device, or may configure different subcarrier spacing for different terminal devices.

In some possible implementation manners, the first transmission resource is a transmission resource corresponding to the first subcarrier spacing, and the method further includes the terminal device determines a second transmission resource on a second time unit on the first carrier, the second transmission resource being a transmission resource corresponding to a second subcarrier spacing, the second transmission resource being configured to receive a second uplink channel, the second transmission resource being allocated with M frequency domain units on the frequency domain, M being a positive integer, and M>N, wherein, the second subcarrier spacing is greater than the first subcarrier spacing; and the network device receives the second uplink channel by the second transmission resource.

It should be understood that in the embodiments of the present disclosure, the network device may configure the first subcarrier spacing and the second subcarrier spacing for different times of one terminal device, or may configure different subcarrier spacing for different terminal devices.

In some possible implementation manners, the second uplink channel includes at least one of the physical random access channel (PRACH) and the physical uplink control channel (PUCCH).

In some possible implementation manners, the method further includes the network device determines first indication information, the first indication information being used to determine the first transmission resource; and the network device sends the first indication information to the terminal device.

In a third aspect, a terminal device is provided, including a method for performing the foregoing first aspect or any possible implementation manner of the first aspect. Specifically, the device includes a unit for performing the method in the first aspect or any possible implementation manner of the first aspect.

In a fourth aspect, a network device is provided, including a method for performing the foregoing second aspect or any possible implementation manner of the second aspect. Specifically, the device includes a unit for performing the method in the foregoing second aspect or any possible implementation manner of the second aspect.

In a fifth aspect, a terminal device is provided, including a memory, a processor, an input interface, and an output interface. Wherein, the memory, processor, input interface, and output interface are connected through a bus system. The memory is used to store instructions, and the processor is used to execute the instructions stored in the memory, to perform the method in the first aspect or any possible implementation manner of the first aspect.

In a sixth aspect, a network device is provided, including a memory, a processor, an input interface, and an output interface. Wherein, the memory, processor, input interface, and output interface are connected through a bus system. The memory is used to store instructions, and the processor is used to execute the instructions stored in the memory, to perform the method in the foregoing second aspect or any possible implementation manner of the second aspect.

In a seventh aspect, a computer-readable medium is provided for storing a computer program, the computer program including instructions for performing the method embodiments of the first aspect or the second aspect.

In an eighth aspect, a computer chip is provided, including an input interface, an output interface, at least one processor, and a memory. The processor is used to execute code in the memory, and when the code is executed, the processor may implement various processes performed by a terminal device in the method for sending the uplink channel in the first aspect and various implementation manners described above.

In a ninth aspect, a computer chip is provided, including an input interface, an output interface, at least one processor, and a memory. The processor is used to execute code in the memory, and when the code is executed, the processor may implement various processes performed by a network device in the method for receiving the uplink channel in the foregoing second aspect and various implementation manners.

In a tenth aspect, a communication system is provided, including the network device described above and the terminal device described above.

BRIEF DESCRIPTION OF THE DRAWINGS

FIG. 1 is a schematic flowchart of a terminal device sending an uplink channel according to an embodiment of the present disclosure.

FIG. 2 is an example of a schematic diagram of a frequency domain unit included in a first transmission resource according to an embodiment of the present disclosure.

FIG. 3 is another example of a schematic diagram of a frequency domain unit included in a first transmission resource according to an embodiment of the present disclosure.

FIG. 4 is another example of a schematic diagram of a frequency domain unit included in a first transmission resource according to an embodiment of the present disclosure.

FIG. 8 is a schematic flowchart of a network device receiving an uplink channel according to an embodiment of the present disclosure.

FIG. 9 is a schematic block diagram of a terminal device according to an embodiment of the present disclosure.

FIG. 10 is a schematic block diagram of a network device according to an embodiment of the present disclosure.

DETAILED DESCRIPTION

Figure 5:
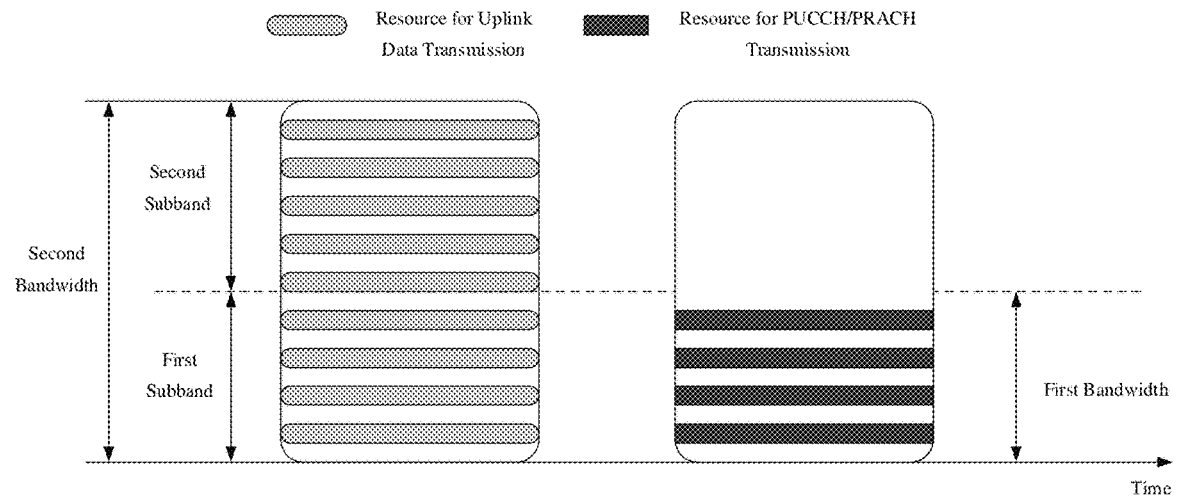
FIG. 5 is an example of an example diagram of a first bandwidth and a second bandwidth according to an embodiment of the present disclosure.

The technical solutions in the present disclosure will be described below with reference to the drawings in the embodiments of present disclosure.

Embodiments of the present disclosure may be applied to various communication systems, such as a Global System of Mobile Communication (GSM) system, a Code Division Multiple Access (CDMA) system, and a Wideband Code Division Multiple Access (WCDMA) system, General Packet Radio Service (GPRS), a Long Term Evolution (LTE) system, an advanced long term evolution (LTE-A) system, a New Radio (NR) system, an evolution system of NR system, an LTE-based access to unlicensed spectrum (LTE-U) system, an NR-based access to unlicensed spectrum on unlicensed spectrum (NR-U) system, a Universal Mobile Telecommunication System (UMTS), a Wireless Local Area Network (WLAN), a Wireless Fidelity (WiFi), a next-generation communication system or other communication systems, etc. Generally speaking, traditional communication systems support a limited number of connections and are easy to implement. However, with the development of communication technologies, mobile communication systems will not only support traditional communication, but also support, for example, Device to Device (D2D) communication, Machine to Machine (M2M) communication, Machine Type Communication (MTC), and Vehicle to Vehicle (V2V) communication, etc. The embodiment of the present disclosure may also be applied to these communication systems. Optionally, the communication systems in an embodiment of the present disclosure may be applied to a carrier aggregation (CA) scenario, a dual connectivity (DC) scenario, or a standalone (SA) network deployment scenario. The embodiments of the present disclosure do not limit the applied frequency spectrum. For example, the embodiment of the present disclosure may be applied to licensed spectrum or unlicensed spectrum.

In the embodiment of the present disclosure, various embodiments are described in conjunction with network devices and terminal devices.

The terminal device may also be called User Equipment (UE), an access terminal, a subscriber unit, a user station, a moving station, a mobile station, a remote station, a remote terminal, a mobile device, a user terminal, a terminal, a wireless communication device, a user agent or a user device, etc. The terminal device may be a STAION (ST) in the WLAN, and may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or other processing devices connected to a wireless modem, an in-vehicle device, a wearable device, and a next-generation communication system, such as a terminal device in an NR network or a terminal device in a public land mobile network (PLMN) that will evolve in the future, etc. As an example and not a limitation, in the embodiment of the present disclosure, the terminal device may also be a wearable device. The wearable device may also be referred to as a wearable smart device, which is a general term for applying wearable technology to intelligently design everyday wear and develop wearable devices, such as glasses, gloves, watches, clothing, and shoes. The wearable device is a portable device that is worn directly on a body or integrated into a user's clothes or accessories. The wearable device is not only a hardware device, but also functions implemented through software support, data interaction, and cloud interaction. Generalized wearable smart devices include full-featured, large-sized, complete or partial functions that do not depend on smartphones, such as smart watches or smart glasses, and only focus on a certain type of application functions, and need to be used in conjunction with other devices (such as smart phones), such as various smart bracelets and smart jewelry for sign monitoring. The network device may be a device for communicating with a mobile device, and the network device may be an Access Point (AP) in the WLAN, a Base Transceiver Station (BTS) in the GSM or CDMA, or a NodeB (NB) in the WCDMA, or an Evolutional Node B (eNB or eNodeB) in the LTE, or a relay station or access point, or a vehicle-mounted device, wearable device, and a gNB in the NR network or a network device in the PLMN that will evolve in the future.

In an embodiment of the present disclosure, the network device provides services for a cell, and the terminal device communicates with the network device through a transmission resource (for example, a frequency domain resource, or a spectrum resource) used by the cell. The cell may be a cell corresponding to the network device (for example, a base station), and the cell may belong to a macro base station or a base station corresponding to a small cell, wherein the small cell may include: a Metro cell, a Micro cell, a Pico cell, a Femto cell, etc. These small cells have characteristics of small coverage and low transmission power, and are suitable for providing high-speed data transmission services.

Optionally, an uplink channel in an embodiment of the present disclosure may include a Physical Random Access Channel (PRACH), a Physical Uplink Control channel (PUCCH), and a Physical Uplink Shared channel (PUSCH), etc. An uplink reference signal may include an uplink DMRS, a sounding reference signal (SRS), a PT-RS, and so on. Wherein, the uplink DMRS may be used for demodulation of the uplink channel, the SRS may be used for measurement of the uplink channel, uplink time-frequency synchronization, or phase tracking, and the PT-RS may also be used for uplink channel measurement, uplink time-frequency synchronization or phase tracking. It should be understood that the embodiment of the present disclosure may include uplink physical channels or uplink reference signals with the same names and different functions as described above, or may also include uplink physical channels or uplink reference signals with different names and same functions, which is not limited in this application.

A method for transmitting an uplink channel according to an embodiment of the present disclosure will be described below with reference to FIGS. 1-8. It should be understood that FIGS. 1 to 8 are schematic flowcharts of the method for transmitting the uplink channel according to the embodiment of the present disclosure, which shows the detailed communication steps or operations of the method, but these steps or operations are only examples, and other operations or variations of the various operations in FIGS. 1 to 8 may be performed in the embodiment of the present disclosure.

In addition, the steps in FIGS. 1 to 8 may be performed in a different order than that shown in FIGS. 1 to 8, respectively, and it may not be necessary to perform all the operations in FIGS. 1-8.

As shown in FIG. 1, the method for the terminal device to send the uplink channel may include the following:

S110, a terminal device determines a first transmission resource on a first time unit on a first carrier, the first transmission resource being configured to transmit a first uplink channel, the first transmission resource being allocated with N frequency domain units on a frequency domain, N being a positive integer, and N≥2.

S120, the terminal device sends the first uplink channel by the first transmission resource.

Optionally, the first carrier is a carrier on an unlicensed spectrum.

As a practical manner, the terminal device may receive first indication information sent by the network device, the first indication information being used to determine the first transmission resource; then, the terminal device determines the first transmission resource according to the first indication information.

Optionally, the terminal device determines at least one of a time domain resource, a frequency domain resource, and a code domain resource of the first transmission resource according to the first indication information.

As an example and not a limitation, the first indication information may be one of Downlink Control Information (DCI), Radio Resource Control (RRC) signaling, and Control Element (CE) in Media Access Control (MAC) signaling.

Optionally, the first uplink channel may include at least one of a PRACH and a PUCCH. Correspondingly, the first transmission resource includes one or more PRACH resources for PRACH transmission, and/or one or more PUCCH resources for PUCCH transmission, which is not limited in the present disclosure.

It should be understood that one PRACH resource or PUCCH resource may be allocated with one or more symbols in the time domain, which is not limited in the present disclosure.

Optionally, each of the N frequency domain units in the embodiment of the present disclosure may include one or more RBs. For ease of description, the following uses a frequency domain unit to include 1 RB as an example.

The first transmission resource in the embodiment of the present disclosure will be described below.

It should be noted that on an unlicensed carrier, an equivalent isotropically radiated power (EIRP) and an equivalent isotropically radiated power density (EIRP density) may not exceed a certain upper limit. The EIRP density is limited to a unit bandwidth. For example, it is assumed that the upper limit of the EIRP density is 10 dBm/MHz, then a maximum EIRP of a signal in 1 MHz bandwidth is 10 dBm, wherein the signal may be allocated with part or all of the bandwidth within the 1 MHz bandwidth.

Optionally, in the embodiment of the present disclosure, the upper limit of the EIRP is the same as a maximum transmission power, and the upper limit of the EIRP density is the same as a maximum transmission power spectral density.

Therefore, in the embodiment of the present disclosure, at least two frequency domain units may be allocated to the uplink channel, wherein the at least two frequency domain units are located in different unit bandwidths, and each of the frequency domain units may be transmitted using the maximum transmission power within the unit bandwidth, thereby increasing the transmission power of the uplink channel in a case where the maximum transmission power spectral density is limited.

In an optional implementation manner, at least two adjacent frequency domain units in the N frequency domain units are discontinuous on the frequency domain.

For example, if the N RBs include RB #1, RB #2, RB #5, and RB #6, then RB #2 and RB #5 are two adjacent RBs in the N RBs, and RB #2 and RB #5 are discontinuous on the frequency domain (separated by RB #3 and RB #4).

In an optional implementation manner, a frequency domain interval between any two adjacent frequency domain units in the N frequency domain units is equal.

For example, it is assumed that the N RBs include RB #0, RB #5, RB #10, RB #15, and RB #20, wherein the frequency domain intervals between two adjacent RBs in the N RBs are all equal. Optionally, a frequency domain distance between two adjacent RBs includes a distance between a starting subcarrier of a previous RB and a starting subcarrier of the following RB.

FIG. 2 shows a schematic diagram of equal frequency domain interval between two adjacent RBs in the N RBs (also called an interleaved structure). As shown in FIG. 2, it is assumed that a transmission bandwidth includes 100 RBs, and the 100 RBs include 10 interleaved resources, wherein each of the interleaved resources includes 10 RBs, and an interval between any two adjacent RBs in the 10 RBs on the frequency domain is equal. Wherein, the N RBs are RBs included in an interleaved resource #0. As shown in FIG. 2, the interlaced resource #0 may include RB labels RB #0, RB #10, RB #20, RB #30, RB #40, RB #50, RB #60, RB #70, RB #80, and RB #90.

It should also be noted that, on the unlicensed carrier, because the maximum transmission power of the signal (or the upper limit of the EIRP) is certain, when a channel transmitted using the maximum transmission power spectral density (or the upper limit of the EIRP density) reaches to the maximum transmission power of the device (or the upper limit of the EIRP), increasing a bandwidth allocated to the signal (or increasing the number of frequency domain units allocated to the signal) may not achieve the effect of increasing the transmission power. For example, in a 5G frequency band, it is assumed that a maximum transmission power of a communication device is 23 dBm, regardless of whether a signal sending bandwidth of the communication device is 20 MHz, 40 MHz, or a larger bandwidth, the maximum transmission power is 23 dBm, but the larger the bandwidth, the lower the transmission power spectral density.

In an optional implementation manner, a bandwidth allocated to the N frequency domain units is less than or equal to a first bandwidth.

For example, it is assumed that the first bandwidth is 20 MHz, a subcarrier interval corresponding to the first transmission resource is 60 kHz, the first transmission resource is allocated with 10 RBs on the frequency domain (that is, N takes a value of 10), and a bandwidth size corresponding to 10 RBs is 7.2 MHz, which is less than the first bandwidth of 20 MHz.

In an optional implementation manner, a size of the first bandwidth is a size of a bandwidth allocated to the communication device when performing signal transmission using the maximum transmission power (or the upper limit of the EIRP) and the maximum transmission power spectral density (or the upper limit of the EIRP density). In other words, a transmission power available for signal transmission within the first bandwidth may reach the maximum transmission power. Using resources exceeding the first bandwidth for signal transmission does not increase the transmission power of the signal.

It should be understood that on the unlicensed carrier, it is necessary to determine whether a channel may be used by channel detection. Normally, if a channel detection bandwidth is inconsistent with a signal transmission bandwidth, for example, the channel detection bandwidth is 20 MHz and the signal transmission bandwidth is 40 MHz, in this case, the probability of determining that the 20 MHz channel may be used is greater than the probability of determining that the 40 MHz channel may be used, that is, the smaller the bandwidth allocated to the signal, the greater the probability of obtaining the right to use the channel.

In an optional implementation manner, the first bandwidth X satisfies the following condition:

$$10*lg(X)+D=P,$$

wherein D represents a maximum transmission power spectral density on the first carrier, in dBm/MHz, P represents a maximum transmission power on the first carrier, in MHz, X in MHz, and lg represents a base-10 logarithm.

Optionally, D=10 dBm/MHz, P=23 dBm, and X=20 MHz. For example, on a 5 GHz spectrum, the size of the first bandwidth is 20 MHz.

Optionally, D=13 dBm/MHz, P=40 dBm, and X=512 MHz. For example, on a 60 GHz spectrum, the size of the first bandwidth is 512 MHz.

It should be understood that a unit of the first bandwidth in the embodiment of the present disclosure may be a bandwidth corresponding to the RB (for example, the number of RBs included in the first bandwidth), or may be megahertz (MHz), which is not specifically limited by the embodiment of the present disclosure. The number of RBs included in the first bandwidth may be determined by the size of the first bandwidth and the size of the subcarrier spacing. In other words, when the size of the first bandwidth is fixed, the number of RBs included in the first bandwidth is determined by the size of the subcarrier spacing, but the embodiment of the present disclosure is not limited thereto.

For example, it is assumed that the first bandwidth is 20 MHz and the subcarrier spacing corresponding to the first transmission resource is 15 kHz, and the first bandwidth may include 100 RBs after reserving guard bands on both sides of the frequency domain.

For example, it is assumed that the first bandwidth is 20 MHz and the subcarrier spacing corresponding to the first transmission resource is 30 kHz, and the first bandwidth may include 50 RBs after reserving the guard bands on both sides of the frequency domain.

For another example, it is assumed that the first bandwidth is 20 MHz and the subcarrier spacing corresponding to the first transmission resource is 60 kHz, and the first bandwidth may include 26 RBs after reserving the guard bands on both sides of the frequency domain.

In an optional implementation manner, a frequency domain interval between a first frequency domain unit and the last frequency domain unit in the N frequency domain units is less than or equal to the first bandwidth.

Optionally, a frequency domain interval between two frequency domain units in the embodiment of the present disclosure may be understood as: a distance between a starting subcarrier of the previous frequency domain unit and a starting subcarrier of the latter frequency domain unit.

Optionally, the frequency domain interval in the embodiment of the present disclosure may be understood as the number of RBs within an interval between two RBs. For example, a frequency domain interval of RB #0 and RB #1 is 1 RB, and a frequency domain interval of RB #0 and RB #9 is 9 RBs.

Taking the unit of the first bandwidth as a bandwidth corresponding to the RB as an example, an implementation method of the frequency domain interval between the first frequency domain unit and the last frequency domain unit of the N frequency domain units being less than or equal to the first bandwidth will be described.

For example, it is assumed that the first bandwidth is 20 MHz, the subcarrier spacing corresponding to the first transmission resource is 15 kHz, and it is assumed that the first bandwidth includes 100 RBs after reserving the guard bands on both sides of the frequency domain, then, the frequency domain interval between the first frequency domain unit and the last frequency domain unit in the N frequency domain units being less than or equal to the first bandwidth may be understood as: a frequency domain interval between a first RB and a last RB of the N RBs is less than or equal to a bandwidth corresponding to 99 RBs.

For another example, it is assumed that the first bandwidth is 20 MHz, the subcarrier spacing corresponding to the first transmission resource is 30 kHz, and it is assumed that the first bandwidth includes 50 RBs after reserving the guard bands on both sides of the frequency domain, then the frequency domain interval between the first frequency domain unit and the last frequency domain unit in the N frequency domain units being less than or equal to the first bandwidth may be understood as: the frequency domain interval between the first RB and the last RB of the N RBs is less than or equal to a bandwidth corresponding to 49 RBs.

For another example, it is assumed that the first bandwidth is 20 MHz, the subcarrier spacing corresponding to the first transmission resource is 60 kHz, and it is assumed that the first bandwidth includes 26 RBs after reserving the guard bands on both sides of the frequency domain, then, the frequency domain interval between the first frequency domain unit and the last frequency domain unit in the N frequency domain units being less than or equal to the first bandwidth may be understood as: the frequency domain interval between the first RB and the last RB of the N RBs is less than or equal to a bandwidth corresponding to 25 RBs.

It should be understood that in the embodiment of the present disclosure, the purpose is to limit transmission of the first uplink channel (such as the PUCCH or the PRACH) to the first bandwidth, so that the terminal device may obtain more channel transmission opportunities without losing transmission power efficiency. The above limitation manner in which the frequency domain interval between the first frequency domain unit and the last frequency domain unit in the N frequency domain units is less than or equal to the first bandwidth is merely an exemplary description, and the embodiment of the present disclosure is not limited to this.

Further, a relationship between the bandwidth allocated to the N frequency domain units and the first bandwidth, and a relationship between the frequency domain interval and the first bandwidth may also be combined to limit transmission of the first uplink channel (such as the PUCCH or the PRACH) on the first bandwidth. In other words, it may be possible that the frequency domain interval between the first frequency domain unit and the last frequency domain unit of the N frequency domain units and the bandwidth allocated to the N frequency domain units have a certain relationship with the first bandwidth X, respectively For example, in an embodiment, the bandwidth allocated to the N frequency domain units is less than or equal to the first bandwidth, and the frequency domain interval between the first frequency domain unit and the last frequency domain unit in the N frequency domain units is less than or equal to the first bandwidth.

FIG. 3 is a schematic diagram showing that a frequency domain interval between a first frequency domain unit and the last frequency domain unit of the N frequency domain units is less than a first bandwidth, and a bandwidth allocated to the N frequency domain units is less than or equal to the first bandwidth, according to an embodiment of the present disclosure.

As shown in FIG. 3, the first bandwidth includes 10 frequency domain units, and the first transmission resource includes 5 frequency domain units. Specifically, the first transmission resource is allocated with RB #0, RB #1, RB #4, RB #5, and RB #8. It may be found that in this case, a frequency domain interval between RB #0 and RB #8 does not exceed the first bandwidth. Moreover, the bandwidth allocated to the first transmission resource does not exceed the first bandwidth.

For example, in another embodiment, the bandwidth allocated to the N frequency domain units is less than or equal to the first bandwidth, and the frequency domain interval between the first frequency domain unit and the last frequency domain unit in the N frequency domain units is greater than the first bandwidth.

FIG. 4 is a schematic diagram showing that a frequency domain interval between a first frequency domain unit and the last frequency domain unit of the N frequency domain units is greater than a first bandwidth, and a bandwidth allocated to the N frequency domain units is less than or equal to the first bandwidth, according to an embodiment of the present disclosure.

As shown in FIG. 4, the first bandwidth includes 10 frequency domain units, and the first transmission resource includes 5 frequency domain units. Specifically, the first transmission resource is allocated with RB #0, RB #5, RB #10, RB #15, and RB #20. It may be found that in this case, the frequency domain interval between RB #0 and RB #20 exceeds a first bandwidth. Moreover, the bandwidth allocated to the first transmission resource does not exceed the first bandwidth.

In an optional implementation manner, the size of the first bandwidth may be smaller than a size of a second bandwidth, wherein the second bandwidth is a bandwidth configured by a network device for the terminal device for uplink transmission.

This is mainly because, for uplink channels such as the PUCCH or PRACH carrying little information, a transmission bandwidth of an uplink signal is increased to increase the transmission power of the signal, but when the bandwidth reaches to a certain value (such as the first bandwidth), then increasing the bandwidth may not achieve the purpose of increasing the transmission power. But for the PUSCH, using a larger transmission bandwidth may transmit more uplink data, so that the terminal device gets a better user experience. Therefore, the bandwidth of PUSCH transmission may not be limited to the first bandwidth.

Optionally, the bandwidth used by the terminal device for PUSCH transmission is greater than the first bandwidth.

FIG. 5 is a schematic diagram showing a first bandwidth less than a second bandwidth according to an embodiment of the present disclosure. As shown in FIG. 5, the second bandwidth allocated by a network device to a terminal device for uplink data transmission includes a first subband and a second subband, wherein the size of the first subband is the same as the size of the first bandwidth. The terminal device may perform uplink data transmission on the second bandwidth on a first time unit and PUCCH or PRACH transmission on the first bandwidth on a second time unit. It should be understood that the embodiment of the present disclosure does not specifically limit a position relationship between the first time unit and the second time unit. For example, the second time unit may be later than the first time unit, and the second time unit may be earlier than the first time unit. The embodiments of the present disclosure also do not limit a frequency domain position of the first transmission resource. For example, the PUCCH or PRACH may be transmitted on the first subband or the second subband, as long as the bandwidth allocated to the PUCCH or PRACH is less than or equal to the first bandwidth.

In an optional implementation manner, the number of frequency domain units allocated to the first transmission resource on the frequency domain is independent of the size of a subcarrier spacing corresponding to the first transmission resource.

For example, when the subcarrier spacing corresponding to the first transmission resource is one of 15 kHz, 30 kHz, or 60 kHz, the first transmission resource is allocated with N frequency domain units on the frequency domain.

This is mainly because, under different subcarrier spacing, the maximum transmission power that may be used by each RB of the N RBs is the same, and the maximum transmission power of uplink channels under different subcarrier spacing may be same through the same configuration N.

In an optional implementation manner, the number of frequency domain units allocated to the first transmission resource on the frequency domain is determined according to a size of the subcarrier spacing corresponding to the first transmission resource.

Optionally, the larger the subcarrier spacing corresponding to the first transmission resource, the greater the number of frequency domain units allocated to the first transmission resource on the frequency domain.

Optionally, when the subcarrier spacing corresponding to the first transmission resource is 15 kHz, the first transmission resource is allocated with N frequency domain units on the frequency domain; when the subcarrier spacing corresponding to the first transmission resource is 30 kHz, the first transmission resource is allocated with 2N frequency domain units on the frequency domain.

Optionally, when the subcarrier spacing corresponding to the first transmission resource is 15 kHz, the first transmission resource is allocated with N frequency domain units on the frequency domain; when the subcarrier spacing corresponding to the first transmission resource is 60 kHz, the first transmission resource is allocated with 4N frequency domain units on the frequency domain.

This is mainly because the larger the subcarrier spacing, the shorter the symbol, and under the same transmission power, the energy corresponding to the signal that uses a larger subcarrier spacing for uplink transmission is smaller. In a case where the maximum transmission power is not reached, configuring more frequency domain units for transmission resources with larger subcarrier spacing may achieve the same coverage as transmission resources with smaller subcarrier spacing.

As an example, the first transmission resource is a transmission resource corresponding to the first subcarrier spacing. The terminal device may also determine a second transmission resource on the second time unit on the first carrier. The second transmission resource is a transmission resource corresponding to a second subcarrier spacing, the second transmission resource is configured to transmit a second uplink channel, and the second transmission resource is allocated with N frequency domain units on the frequency domain. The second subcarrier spacing is greater than the first subcarrier spacing. Further, the terminal device may also send the second uplink channel to the network device by the second transmission resource.

It should be understood that in the embodiment of the present disclosure, the network device may configure the first subcarrier spacing and the second subcarrier spacing for different terminal devices at different times, or may configure different subcarrier spacing for different terminal devices.

Figure 6:
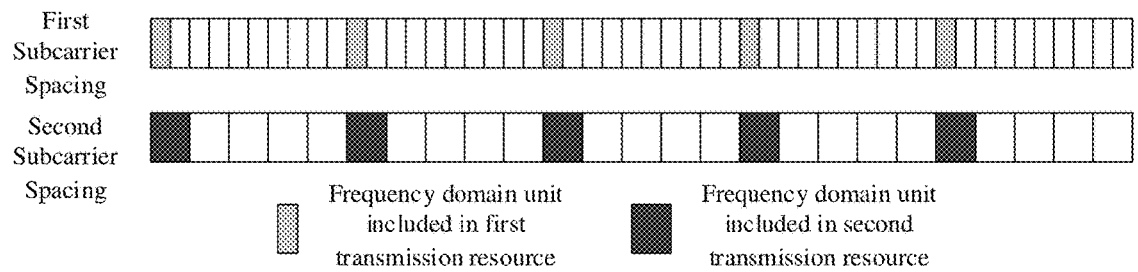
FIG. 6 is an example of a schematic diagram of a frequency domain unit included in a first transmission resource and a frequency domain unit included in a second transmission resource according to an embodiment of the present disclosure.

FIG. 6 is an example block diagram showing that the number of frequency domain units included in a first transmission resource corresponding to a first subcarrier spacing is the same as the number of frequency domain units included in a second transmission resource corresponding to a second subcarrier spacing, according to an embodiment of the present disclosure.

Specifically, as shown in FIG. 6, it is assumed that a value of N is 5, the first subcarrier spacing is 15 kHz, and the first transmission resource is allocated with RB #0, RB #10, RB #20, RB #30, and RB #40; the second subcarrier spacing is 30 kHz, and the second transmission resource is allocated with RB #0, RB #5, RB #10, RB #15, and RB #20. It may be found that in this case, although the first transmission resource and the second transmission resource are transmission resources corresponding to different subcarrier spacing, the number of occupied RBs is the same. Correspondingly, since a maximum transmission power that may be used by each of the N RBs is the same, the maximum transmission power that may be used by the first transmission resource and the second transmission resource is the same.

In the embodiment of the present disclosure, it is also possible to configure more frequency domain units for transmission resources with larger subcarrier spacing, and thus to achieve the same coverage as transmission resources with smaller subcarrier spacing.

As an example, the first transmission resource is a transmission resource corresponding to the first subcarrier spacing. The terminal device may also determine the second transmission resource on a second time unit on the first carrier. The second transmission resource is a transmission resource corresponding to the second subcarrier spacing. The second transmission resource is configured to transmit a second uplink channel, and the second transmission resource is allocated with M frequency domain units on a frequency domain, M is a positive integer and M>N. The second subcarrier spacing is greater than the first subcarrier spacing. Further, the terminal device may also send the second uplink channel to the network device by the second transmission resource.

It should be understood that in the embodiment of the present disclosure, the network device may configure the first subcarrier spacing and the second subcarrier spacing for different terminal devices at different times, or may configure different subcarrier spacing for different terminal devices.

Figure 7:
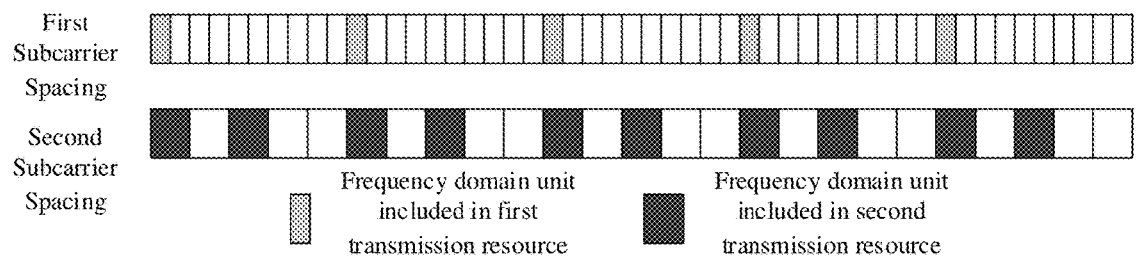
FIG. 7 is another example of a schematic diagram of a frequency domain unit included in a first transmission resource and a frequency domain unit included in a second transmission resource according to an embodiment of the present disclosure.

FIG. 7 is an example block diagram showing that the number of frequency domain units included in a first transmission resource corresponding to a first subcarrier spacing is less than the number of frequency domain units included in a second transmission resource corresponding to a second subcarrier spacing, according to an embodiment of the present disclosure.

Specifically, as shown in FIG. 7, it is assumed that a value of N is 5, a value of M is 10, the first subcarrier spacing is 15 kHz, and the first transmission resource is allocated with RB #0, RB #10, RB #20, RB #30, and RB #40; the second subcarrier spacing is 30 kHz, and the second transmission resource is allocated with RB #0, RB #2, RB #5, RB #7, RB #10, RB #12, RB #15, RB #17, RB #20, and RB #22. That is, the larger the subcarrier spacing is, the more RBs are allocated. Since the larger the subcarrier spacing, the shorter the symbol, and under the same transmission power, the energy corresponding to the signal that uses a larger subcarrier spacing for uplink transmission is smaller. Therefore, in a case where the maximum transmission power is not reached, configuring more frequency domain units for transmission resources with larger subcarrier spacing may achieve the same coverage as transmission resources with smaller subcarrier spacing.

Optionally, the second uplink channel may include at least one of a PRACH and a PUCCH.

As a practical implementation, a resource allocated to one PRACH resource or one PUCCH resource on a frequency domain is less than or equal to a first bandwidth.

Optionally, a frequency domain interval between a first RB and the last RB allocated to one PUCCH resource (or one PRACH resource) on the frequency domain is less than or equal to the first bandwidth.

Optionally, the size of the resource allocated to one PUCCH resource (or one PRACH resource) on the frequency domain may be specified by a communication system (for example, a value of N is specified by the system) or configured by a network device (for example, the network device notifies the value of N to the terminal device by RRC).

Optionally, one PUCCH resource (or one PRACH resource) is allocated with N RBs on the frequency domain, wherein a relative position relationship between the N RBs may be specified by the communication system or configured by the network device. Further optionally, the terminal device determines the frequency domain position of the PUCCH resource (or the PRACH resource) according to first indication information.

Optionally, the size of the resource allocated to one PUCCH resource (or one PRACH resource) on the frequency domain is determined according to a size of a subcarrier spacing corresponding to the PUCCH resource (or the PRACH resource).

Optionally, the resource allocated to one PUCCH resource (or one PRACH resource) has an interleaved structure.

In the embodiment of the present disclosure, by limiting the transmission of a first uplink channel (such as the PUCCH or the PRACH) to the first bandwidth, the terminal device may obtain more channel transmission opportunities without losing transmission power efficiency. Further, a mapping of the first uplink signal in the first bandwidth may also adopt the interlaced structure to achieve maximum power utilization efficiency.

As shown in FIG. 8, a method for receiving an uplink channel by a network device may include the following:

S210, a network device determines a first transmission resource on a first time unit on a first carrier, the first transmission resource being configured to transmit a first uplink channel, the first transmission resource being allocated with N frequency domain units on a frequency domain, N is a positive integer, and N≥2;

S220, the network device receives the first uplink channel by the first transmission resource.

In an optional implementation manner, a frequency domain interval between a first frequency domain unit and the last frequency domain unit in the N frequency domain units is less than or equal to a first bandwidth.

In an optional implementation manner, a bandwidth allocated to the N frequency domain units is less than or equal to the first bandwidth.

In an optional implementation manner, the first bandwidth is X, and X satisfies the following condition:

$$10*lg(X)+D=P,$$

wherein D represents a maximum transmission power spectral density on the first carrier, in dBm/MHz, P represents a maximum transmission power on the first carrier, in MHz, X in MHz, and lg represents a base-10 logarithm.

In an optional implementation manner, the first bandwidth is smaller than a second bandwidth, wherein the second bandwidth is a bandwidth configured by the network device for a terminal device for uplink transmission.

In an optional implementation manner, at least two adjacent frequency domain units in the N frequency domain units are discontinuous on the frequency domain.

In an optional implementation manner, N>2, and a frequency domain interval between any two adjacent frequency domain units in the N frequency domain units are equal.

In an optional implementation manner, the first uplink channel includes at least one of a physical random access channel (PRACH) and a physical uplink control channel (PUCCH).

In an optional implementation manner, the first transmission resource is a transmission resource corresponding to a first subcarrier spacing, and the method further includes:

the network device determines a second transmission resource on a second time unit on the first carrier, the second transmission resource being a transmission resource corresponding to a second subcarrier spacing, the second transmission resource being configured to receive a second uplink channel, the second transmission resource being allocated with N frequency domain units on the frequency domain, wherein, the second subcarrier spacing is greater than the first subcarrier spacing.

In an optional implementation manner, the first transmission resource is a transmission resource corresponding to a first subcarrier spacing, and the method further includes:

the terminal device determines a second transmission resource on a second time unit on the first carrier, the second transmission resource being a transmission resource corresponding to a second subcarrier spacing, the second transmission resource being configured to receive a second uplink channel, the second transmission resource being allocated with M frequency domain units on the frequency domain, M being a positive integer, and M>N, wherein, the second subcarrier spacing is greater than the first subcarrier spacing.

In an optional implementation manner, the second uplink channel includes at least one of the PRACH and the PUCCH.

In an optional implementation manner, the method further includes the network device determines first indication information, the first indication information being used to determine the first transmission resource; and the network device sends the first indication information to the terminal device.

It should be understood that, for the steps in the uplink channel transmission method 200, reference may be made to the corresponding steps in the uplink channel transmission method 100, and for the sake of brevity, details are not described herein.

The method embodiments of the present disclosure are described in detail above with reference to FIGS. 1-8, and the device embodiments of the present disclosure are described in detail below with reference to FIGS. 9-12. It should be understood that the device embodiments and the method embodiments may correspond to each other, and for similar descriptions, reference may be made to method embodiments. To avoid repetition, it will not be repeated here.

FIG. 9 is a schematic block diagram of a terminal device 300 according to an embodiment of the present disclosure. Specifically, as shown in FIG. 9, the terminal device 300 includes a processing unit 310, configured to determine a first transmission resource on a first time unit on a first carrier, the first transmission resource being configured to transmit a first uplink channel, the first transmission resource being allocated with N frequency domain units on a frequency domain, N being a positive integer, and N≥2; and a communication unit 320, configured to transmit the first uplink channel by the first transmission resource.

In an optional implementation manner, a frequency domain interval between a first frequency domain unit and a last frequency domain unit in the N frequency domain units is less than or equal to a first bandwidth.

In an optional implementation manner, a bandwidth allocated to the N frequency domain units is less than or equal to the first bandwidth.

In an optional implementation manner, the first bandwidth is X, and X satisfies the following condition:

$$10*lg(X)+D=P,$$

wherein D represents a maximum transmission power spectral density on the first carrier, in dBm/MHz, P represents a maximum transmission power on the first carrier, in MHz, X in MHz, and lg represents a base-10 logarithm.

In an optional implementation manner, the first bandwidth is smaller than a second bandwidth, wherein the second bandwidth is a bandwidth configured by a network device for the terminal device for uplink transmission.

In an optional implementation manner, at least two adjacent frequency domain units in the N frequency domain units are discontinuous on the frequency domain.

In an optional implementation manner, N>2, and a frequency domain interval between any two adjacent frequency domain units in the N frequency domain units are equal.

In an optional implementation manner, the first uplink channel includes at least one of a physical random access channel (PRACH) and a physical uplink control channel (PUCCH).

In an optional implementation manner, the first transmission resource is a transmission resource corresponding to a first subcarrier spacing, and the processing unit 310 is further configured to determine a second transmission resource on a second time unit on the first carrier, the second transmission resource being a transmission resource corresponding to a second subcarrier spacing, the second transmission resource being configured to transmit a second uplink channel, the second transmission resource being allocated with N frequency domain units on the frequency domain, wherein, the second subcarrier spacing is greater than the first subcarrier spacing; the communication unit 320 is further configured to: send the second uplink channel by the second transmission resource.

In an optional implementation manner, the first transmission resource is a transmission resource corresponding to the first subcarrier spacing, and the processing unit 310 is further configured to determine a second transmission resource on a second time unit on the first carrier, the second transmission resource being a transmission resource corresponding to a second subcarrier spacing, the second transmission resource being configured to transmit a second uplink channel, the second transmission resource being allocated with M frequency domain units on the frequency domain, M being a positive integer, and M>N, wherein, the second subcarrier spacing is greater than the first subcarrier spacing; the communication unit 320 is further configured to: send the second uplink channel by the second transmission resource.

In an optional implementation manner, the second uplink channel includes at least one of the PRACH and the PUCCH.

In an optional implementation manner, the foregoing processing unit 310 is specifically configured to receive first indication information sent by a network device, wherein the first indication information is used to determine the first transmission resource, and the first transmission resource is determined according to the first indication information.

FIG. 10 is a schematic block diagram of a network device 400 according to an embodiment of the present disclosure. Specifically, as shown in FIG. 10, the network device 400 may include a processing unit 410, configure to determine a first transmission resource on a first time unit on a first carrier, the first transmission resource being configured to receive a first uplink channel, the first transmission resource being allocated with N frequency domain units on a frequency domain, N being a positive integer, and N≥2; and a communication unit 420, configured to receive the first uplink channel by the first transmission resource.

In an optional implementation manner, a frequency domain interval between a first frequency domain unit and a last frequency domain unit in the N frequency domain units is less than or equal to a first bandwidth.

In an optional implementation manner, a bandwidth allocated to the N frequency domain units is less than or equal to the first bandwidth.

In an optional implementation manner, the first bandwidth is X, and X satisfies the following condition:

$$10*lg(X)+D=P,$$

wherein D represents a maximum transmission power spectral density on the first carrier, in dBm/MHz, P represents a maximum transmission power on the first carrier, in MHz, X in MHz, and lg represents a base-10 logarithm.

In an optional implementation manner, the first bandwidth is smaller than a second bandwidth, wherein the second bandwidth is a bandwidth configured by the network device for a terminal device for uplink transmission.

In an optional implementation manner, at least two adjacent frequency domain units in the N frequency domain units are discontinuous on the frequency domain.

In an optional implementation manner, N>2, and a frequency domain interval between any two adjacent frequency domain units in the N frequency domain units are equal.

In an optional implementation manner, the first uplink channel includes at least one of a physical random access channel (PRACH) and a physical uplink control channel (PUCCH).

In an optional implementation manner, the first transmission resource is a transmission resource corresponding to a first subcarrier spacing, and the processing unit 410 is further configured to determine a second transmission resource on a second time unit on the first carrier, the second transmission resource being a transmission resource corresponding to a second subcarrier spacing, the second transmission resource being configured to receive a second uplink channel, and the second transmission resource being allocated with N frequency domain units on the frequency domain, wherein, the second subcarrier spacing is greater than the first subcarrier spacing; the communication unit 420 is further configured to: send the second uplink channel by the second transmission resource.

In an optional implementation manner, the first transmission resource is a transmission resource corresponding to a first subcarrier spacing, and the processing unit 410 is further configured to determine a second transmission resource on a second time unit on the first carrier, the second transmission resource being a transmission resource corresponding to a second subcarrier spacing, the second transmission resource being configured to transmit a second uplink channel, the second transmission resource being allocated with M frequency domain units on the frequency domain, M being a positive integer, and M>N, wherein, the second subcarrier spacing is greater than the first subcarrier spacing; the communication unit 420 is further configured to: send the second uplink channel by the second transmission resource.

In an optional implementation manner, the second uplink channel includes at least one of the PRACH and the PUCCH.

In an optional implementation manner, the foregoing processing unit 410 is further configured to determine first indication information, the first indication information being used to determine the first transmission resource; the network device further includes a sending unit, configured to send the first indication information to the terminal device.

In an implementation process, each step of the method embodiment in the embodiment of the present disclosure may be completed by an integrated logic circuit of hardware in a processor or instructions in the form of software. More specifically, the steps of the method disclosed in conjunction with the embodiments of the present disclosure may be directly embodied and executed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, and a register. The storage medium is located in the memory, and the processor reads the information in the memory and completes the steps of the above method in combination with its hardware.

In the implementation process, each step of the method embodiment in the embodiments of the present disclosure may be completed by an integrated logic circuit of hardware in a processor or instructions in the form of software. More specifically, the steps of the method disclosed in conjunction with the embodiments of the present disclosure may be directly embodied and executed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, and a register. The storage medium is located in the memory, and the processor reads the information in the memory and completes the steps of the above method in combination with its hardware.

It should be understood that the processor mentioned in the embodiment of the present disclosure may be an integrated circuit chip with signal processing capabilities, and may implement or execute the disclosed methods, steps, and logical block diagrams in the embodiment of the present disclosure. For example, the aforementioned processor may be a general-purpose processor, a digital signal processor (DSP), an application specific integrated circuit (ASIC), a field programmable gate array (FPGA), or other programmable logic devices, transistor logic devices, discrete hardware components, etc. In addition, the general-purpose processor may be a microprocessor or the processor may be any conventional processor or the like.

In addition, the memory mentioned in the embodiment of the present disclosure may be a volatile memory or a non-volatile memory, or may include both volatile and non-volatile memory. Wherein, the non-volatile memory may be a read-only memory (ROM), a programmable ROM (PROM), an erasable PROM (EPROM), an electronically EPROM (EEPROM) or a flash memory. The volatile memory may be a random access memory (RAM), which is used as an external cache. It should be understood that the foregoing memory is exemplary but not limiting, for example, the memory in the embodiment of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is, the memories of the systems and methods described herein are intended to include, but are not limited to these and any other suitable types of memories.

Figure 11:
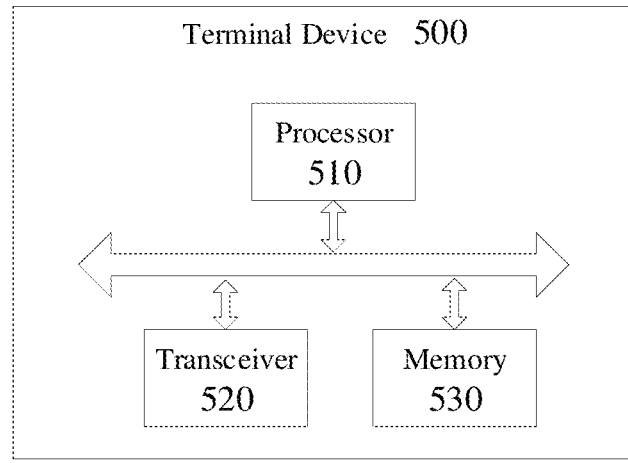
FIG. 11 is a schematic block diagram of another terminal device according to an embodiment of the present disclosure.

As an example, the above-mentioned processing unit 310 may be implemented by a processor, and the communication unit 320 may be implemented by a transceiver. Specifically, as shown in FIG. 11, a terminal device 500 may include a processor 510, a transceiver 520, and a memory 530. The terminal device 500 may implement various processes implemented by the terminal device in the foregoing method embodiments of FIGS. 1-8. To avoid repetition, details are not described herein again. That is to say, the method embodiments in the embodiments of the present disclosure may be implemented by the processor and the transceiver.

Figure 12:
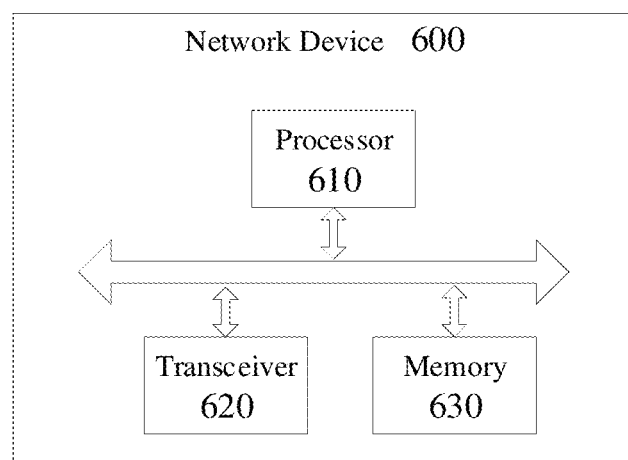
FIG. 12 is a schematic block diagram of another network device according to an embodiment of the present disclosure.

As another example, the above-mentioned processing unit 410 may be implemented by a processor, and the communication unit 420 may be implemented by a transceiver. Specifically, as shown in FIG. 12, a network device 600 may include a processor 610, a transceiver 620, and a memory 630. The network device 600 may implement various processes implemented by the network device in the foregoing method embodiments of FIGS. 1-8. To avoid repetition, details are not described herein again. That is to say, the method embodiments in the embodiments of the present disclosure may be implemented by the processor and the transceiver.

A computer-readable storage medium is also provided in an embodiment of the present disclosure. The computer-readable storage medium stores one or more programs. The one or more programs include instructions. When the instructions are executed by a portable electronic device including a plurality of application programs, the instruction may enable the portable electronic device to execute the method of the embodiments shown in FIGS. 1-8.

A computer program is also provided in an embodiment of the present disclosure. The computer program includes instructions, and when the computer program is executed by the computer, the computer may execute the corresponding flow of the method in the embodiments shown in FIGS. 2-4.

Finally, it should be noted that the terms used in the embodiments of the present disclosure and the appended claims are only for the purpose of describing specific embodiments and are not intended to limit the embodiments of the present disclosure.

For example, the singular forms "a," "said," "above," and "the" used in the embodiments of the present disclosure and the appended claims are also intended to include most forms unless the context clearly indicates other meaning.

Those skilled in the art may clearly understand that for the convenience and conciseness of the description, the specific working process of the system, device, and unit described above may refer to the corresponding process in the foregoing method embodiments, which will not be repeated here.

In the several embodiments provided in this application, it should be understood that the disclosed system, device, and method may be implemented in other ways. For example, the device embodiments described above are only schematic. For example, the division of the unit is only a logical function division, and there may be other divisions in actual implementation. For example, multiple units or components may be combined or it may be integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or may be distributed on multiple network units. Some or all of the units may be selected according to actual needs to achieve the objectives of the embodiments of the present disclosure.

In addition, each functional unit in the embodiment of the present disclosure may be integrated into one processing unit, or each unit may exist alone physically, or two or more units may be integrated into one unit.

If implemented in the form of a software functional unit and sold or used as an independent product, it may be stored in a computer-readable storage medium. Based on such an understanding, the technical solutions of the embodiments of the present disclosure may essentially be a part that contributes to the existing technology or a part of the technical solution may be embodied in the form of a software product, and the computer software product is stored in a storage medium, Including several instructions to enable a computer device (which may be a personal computer, server, or network device, etc.) to perform all or part of the steps of the method described in this embodiment of the present disclosure. The foregoing storage media include various media that may store program codes, such as a U disk, a mobile hard disk, a read-only memory, a random access memory, a magnetic disk, or an optical disk.

The above content is only a specific implementation manner of the embodiments of the present disclosure, but the protection scope of the embodiments of the present disclosure is not limited thereto. Any person skilled in the art may easily think of changes or replacements within the technical scope disclosed in the embodiments of the present disclosure, and they should be covered by the protection scope of the embodiments of the present disclosure. Therefore, the protection scope of the embodiments of the present disclosure shall be subject to the protection scope of the claims.

What is claimed is:

1. A method for sending an uplink channel, comprising:
    determining, by a terminal device, a first transmission resource on a transmission bandwidth on a first carrier based on a first indication information sent by a network device, the first transmission resource being configured to transmit a physical uplink control channel (PUCCH), the first transmission resource comprising N frequency domain units on a first subband on the transmission bandwidth,
    wherein at least a first frequency domain unit and a second frequency domain unit are discontinuous in the frequency domain among the N frequency domain units, any frequency domain unit among the N frequency domain units is not positioned between the first frequency domain unit and the second frequency domain unit, where N is a positive integer greater than 2, and the transmission bandwidth is a bandwidth configured by a network device for the terminal device for uplink transmission,
    wherein the transmission bandwidth comprises the first subband and a second subband, and the first indication information is used to indicate that the first transmission resource is on the first subband, and the first indication information is used to indicate a frequency domain position of the first transmission resource, and
    wherein the first indication information is sent by the network device via radio resource control (RRC) signaling; and transmitting, by the terminal device, the PUCCH by the first transmission resource.

2. The method according to claim 1, wherein frequency domain interval between any pair of the first frequency domain unit and the second frequency domain unit among the N frequency domain units are the same.

3. The method according to claim 2, wherein:
    if a sub carrier spacing corresponding to the first transmission resource is 15 kHz, the frequency domain interval comprises 10 frequency domain units; and
    if a sub carrier spacing corresponding to the first transmission resource is 30 kHz, the frequency domain interval comprises 5 frequency domain units.

4. The method according claim 1, wherein:
    if a sub carrier spacing corresponding to the first transmission resource is 15 kHz, the first transmission resource comprises N frequency domain units; and
    if a sub carrier spacing corresponding to the first transmission resource is 30 kHz, the first transmission resource comprises 2N frequency domain units.

5. The method according to claim 1, wherein a frequency domain spacing among the N frequency domain units is specified by a communication system.

6. The method of claim 1, wherein the first indication information received via the RRC indicates an allocation of the first transmission resource.

7. A method for receiving an uplink channel, comprising:
    determining, by a network device, a first transmission resource on a transmission bandwidth on a first carrier, the first transmission resource being configured to transmit a physical uplink control channel (PUCCH), the first transmission resource comprising N frequency domain units on a first subband of the transmission bandwidth;
    determining, by the network device, first indication information, the first indication information being used to indicate a frequency domain position of the first transmission resource; and
    sending, by the network device, the first indication information via radio resource control (RRC) signaling to a terminal device,
    wherein at least a first frequency domain unit and a second frequency domain unit are discontinuous in the frequency domain among the N frequency domain units, any frequency domain unit among the N frequency domain units is not positioned between the first frequency domain unit and the second frequency domain unit, where N is a positive integer equal to or greater than 2, and the transmission bandwidth is a bandwidth configured by the network device for a terminal device for uplink transmission, and
    wherein the transmission bandwidth comprises the first subband and a second subband, and the first indication information is used to indicate that the first transmission resource is on the first subband; and
    receiving, by the network device, the PUCCH by the first transmission resource.

8. The method according to claim 7, wherein frequency domain interval between any pair of the first frequency domain unit and the second frequency domain unit among the N frequency domain units are the same.

9. The method according to claim 8, wherein:
    if a sub carrier spacing corresponding to the first transmission resource is 15 kHz, the frequency domain interval comprises 10 frequency domain units; and
    if a sub carrier spacing corresponding to the first transmission resource is 30 kHz, the frequency domain interval comprises 5 frequency domain units.

10. The method according to claim 7, wherein:
    if a sub carrier spacing corresponding to the first transmission resource is 15 kHz, the first transmission resource comprises N frequency domain units; and
    if a sub carrier spacing corresponding to the first transmission resource is 30 kHz, the first transmission resource comprises 2N frequency domain units.

11. The method according to claim 7, wherein a frequency domain spacing among the N frequency domain units is specified by a communication system.

12. The method of claim 7, wherein the first indication information sent via the RRC signaling indicates an allocation of the first transmission resource.

13. A terminal device, comprising a memory and a processor, wherein the memory is used to store instructions, and the processor is used to execute the instructions stored in the memory, to:
determine a first transmission resource on a transmission bandwidth on a first carrier based on first indication information sent by a network device, the first transmission resource being configured to transmit a physical uplink control channel (PUCCH), the first transmission resource comprising N frequency domain units on a first subband on the transmission bandwidth,
wherein at least a first frequency domain unit and a second frequency domain unit are discontinuous in the frequency domain among the N frequency domain units, any frequency domain unit among the N frequency domain units is not positioned between the first frequency domain unit and the second frequency domain unit, where N is a positive integer equal to or greater than 2, and the transmission bandwidth is a bandwidth configured by a network device for the terminal device for uplink transmission,
wherein the transmission bandwidth comprises the first subband and a second subband, and the first indication information is used to indicate that the first transmission resource is on the first subband, and the first indication information is used to indicate a frequency domain position of the first transmission resource, and wherein the first indication information is sent by the network device via radio resource control (RRC) signaling; and
transmit the PUCCH by the first transmission resource.

14. The terminal device of claim 13, wherein the first indication information received via the RRC indicates an allocation of the first transmission resource.

15. A network device, comprising a memory and a processor, wherein the memory is used to store instructions, and the processor is used to execute the instructions stored in the memory, to:
determine a first transmission resource on a transmission bandwidth on a first carrier, the first transmission resource being configured to transmit a physical uplink control channel (PUCCH), the first transmission resource comprising N frequency domain units on a first subband of the transmission bandwidth,
determining, by the network device, first indication information, the first indication information being used to indicate a frequency domain position of the first transmission resource, and
sending, by the network device, the first indication information via radio resource control (RRC) signaling to a terminal device,
wherein at least a first frequency domain unit and a second frequency domain unit are discontinuous in the frequency domain among the N frequency domain units, any frequency domain unit among the N frequency domain units is not positioned between the first frequency domain unit and the second frequency domain unit, where N is a positive integer equal to or greater than 2, and the transmission bandwidth is a bandwidth configured by the network device for a terminal device for uplink transmission, and
wherein the transmission bandwidth comprises the first subband and a second subband, and the first indication information is used to indicate that the first transmission resource is on the first subband and the first indication information is used to indicate a frequency domain position of the first transmission resource; and
receive the PUCCH by the first transmission resource.

16. The network device of claim 15, wherein the first indication information sent via the RRC signaling indicates an allocation of the first transmission resource.

* * * * *